356-138
1/4/77   SR
XR   4,000,948

United States Patent [19]
Miller

[11] 4,000,948
[45] Jan. 4, 1977

[54] TARGET METHOD AND SYSTEMS FOR BONDING MACHINES

[76] Inventor: C. Frederick Miller, 2165 N. Glassell St., Orange, Calif. 92667

[22] Filed: July 14, 1975

[21] Appl. No.: 595,790

[52] U.S. Cl. .............................. 356/172; 356/138; 350/10
[51] Int. Cl.² ........................................ G01B 11/26
[58] Field of Search ............ 350/10; 356/138, 172, 356/142

[56] References Cited
UNITED STATES PATENTS

| | | | |
|---|---|---|---|
| 2,472,809 | 6/1949 | Decker | 350/10 |
| 2,942,345 | 6/1960 | Goldberg | 350/10 |
| 3,175,458 | 3/1965 | Da Costa | 350/10 |
| 3,558,212 | 1/1971 | Ritchie | 350/10 |
| 3,582,178 | 6/1971 | Boughton | 350/10 |
| 3,615,124 | 10/1971 | Blankenburg | 350/10 |

OTHER PUBLICATIONS

Baron et al., "Aligning Semiconductor Masks," *IBM Technical Disclosure Bulletin*, vol. 13, No. 7, Dec. 1970, pp. 1816–1817.

*Primary Examiner*—John K. Corbin
*Assistant Examiner*—Richard A. Rosenberger
*Attorney, Agent, or Firm*—Grover A. Frater

[57] ABSTRACT

An improved method for placing the work point of a work piece in alignment with a line of action of a bonding tool is provided by interposing a partially reflecting mirror between a viewing microscope and the line of action of the tool, and projecting a target image on said mirror such that the image coincides with the line of sight to the work point of the tool.

The method can be practiced with an apparatus attached to the output end of a microscope and which includes an image projector formed by a light source and a transparency. Provision is made for moving the transparency to an effective distance from the mirror corresponding to the distance from the mirror to the work piece whereby the image will appear to be superimposed on the work piece notwithstanding that the degree of illumination of the work piece exceeds the level of target image illumination.

8 Claims, 9 Drawing Figures

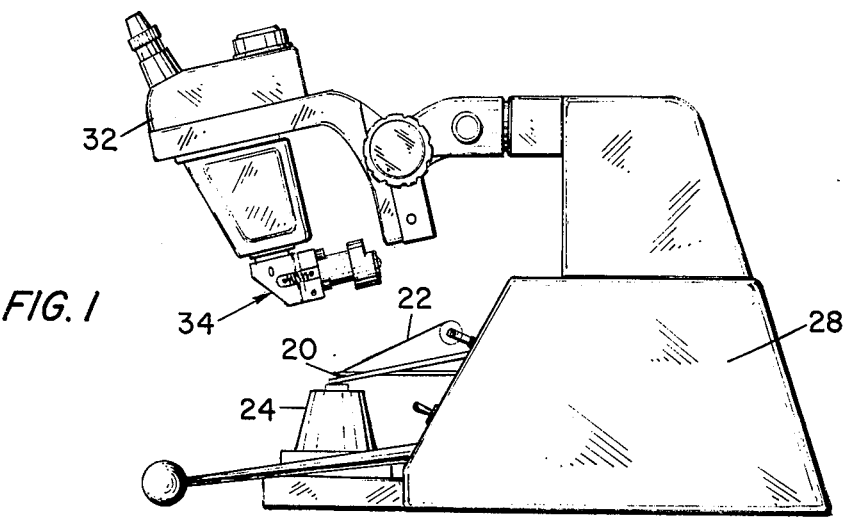
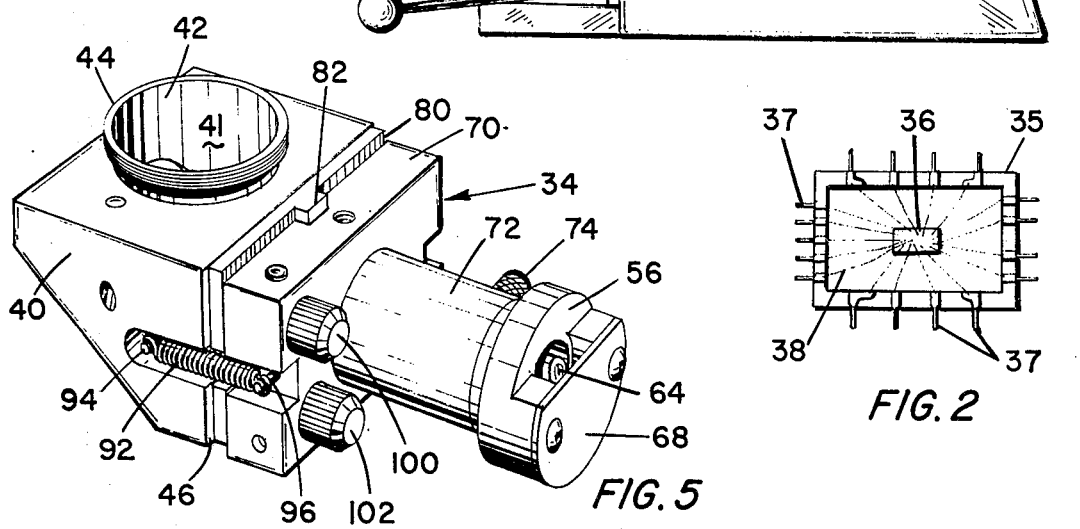
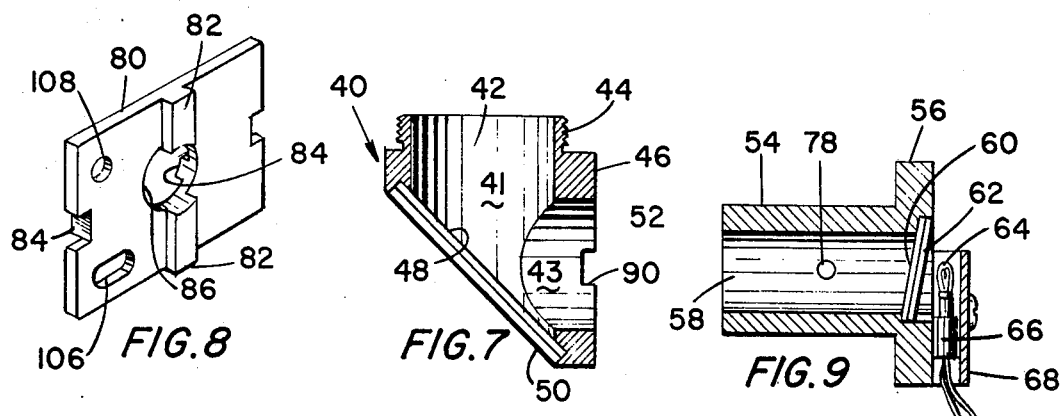
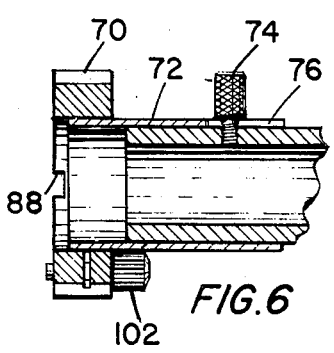
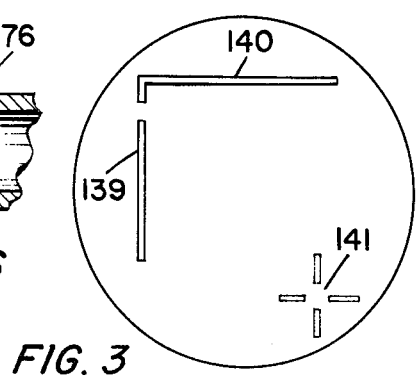
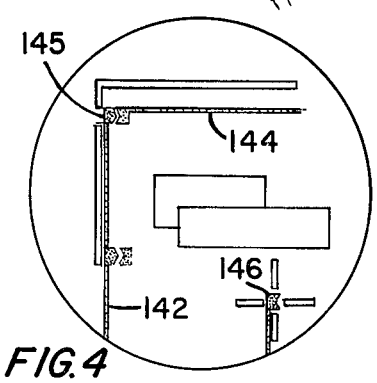

TARGET METHOD AND SYSTEMS FOR BONDING MACHINES

This invention relates to improvements in methods and means for adjusting the position of a work piece so that its work point is in the line of action of a work tool.

BACKGROUND

While the invention is not limited thereto, it is particularly useful in connection with the creation and interconnection of micro-miniature electronic circuitry. The physical dimensions involved in semi-conductor hybrid, and integrated circuitry are such that the work must be viewed through a powerful microscope. Point to point wiring is accomplished with wires that may be only one or two mils in diameter, and the wires must be attached to circuit points that measure only a few thousandths of an inch squared in area. Microscope magnification is so great that the perception of depth is difficult, and colors largely give way to silvers and grays. It is difficult in that visual environment to bring together work elements, work place, and work tools.

The opportunity for error is great, and the cost of error may well be great, so a number of attempts have been made to find a method or an apparatus by which proper alignment can be insured. In general, those attempts are divided into two kinds. In one kind, an attempt is made to place target markings on optical elements within the microscope. That kind of arrangement has the advantage that the position of the target remains fixed against vibration. However, the fact that it is fixed is a disadvantage in that both the work piece and the tool must be moveable into alignment with the target unless an attempt is made to move the microscopic. Moreover, the kind of target that is placed in the optical system is necessarily one that tends to obscure the work and the work place.

The other kind of solution involves information of a target image as a spot or other pattern of light in which light intensity is greatly increased over the ambient light level. It has been accomplished by projecting a very high intensity light image from a separate projector down onto the work piece. That second approach has proven to be the more successful of the two. It has the advantage that if the projector is properly focused so that the light image is well defined at the work place, focusing the stereo microscope brings the work and the target image into view simultaneously. However, that system involves two difficulties. One difficulty is that a separate projector is required and the apparatus must be arranged so that a clear path is maintained for projection of the light image to the work place. In most wire bonding machine constructions, the projection must be placed at a substantial distance from the work point. As a consequence, much movement and instability of the target image can result from vibration and the movements of the operator in using the apparatus. However, a second and more difficult problem is presented by the fact that the work place must ordinarily be very highly illuminated, and as a consequence, the target image must be projected at very high intensity. That requirement leads to the use of special high intensity lamps and structures for dissipating heat from them. As a consequence, the target projector has been a device of considerable size and weight which, for that reason and because of its temperature, must be kept well removed from the work place whereby the problem with vibration is magnified.

SUMMARY

It is an object of this invention to provide an improved method and means for providing a target image at the work place and for using that target image to accomplish alignment of the work place, the work element, and the work tool. The invention utilizes an arrangement different from either of the approaches described above. It does not place the target image in the optics of the microscope and it does not project the target on the work place. Instead, it employs a partial mirror placed in the objective field of the microscope at a point between the microscope optics and the work place. The mirror is placed so that it can reflect a light target up into the optical system of the microscope while permitting viewing of the work place. The target is placed at a distance from the mirror which is effectively equal to the distance from the mirror to the work place, whereby the work place and the target are brought into focus together as the microscope is adjusted. Placement of the mirror in that position is one step in a very simple and effective method of work and tool alignment, and it has the very great advantage that the target image is created with a very low level of illumination. To provide a target in the form of a light image at low illumination is a major object of the invention. Other objects are to provide a target projector which is carried by, and therefore, which moves with, the microscope. Another object is to provide a target arrangement in which the image is easily changed so that a target specifically suitable for each kind of task can be provided with ease. A still further object is to provide an apparatus which will provide a lighted target without the need for a special optical system other than a partial mirror.

DESCRIPTION OF THE DRAWINGS

FIG. 1 is a view in side elevation of a wire bonding machine which is fitted with a stereo microscope and an image creating and projecting means according to the invention;

FIG. 2 is a top plan view of a representative work piece of the kind on which the invention is practiced;

FIG. 3 is a schematic representation of a target image produced according to the invention as it appears when viewed through the microscope of FIG. 1;

FIG. 4 is a schematic representation of the target image of FIG. 3 viewed simultaneously with a portion of the integrated circuit of FIG. 2;

FIG. 5 is an isometric view of the structure by which a target image is projected into the objective field of the microscope;

FIG. 6 is a cross-sectional view of a fragment of the structure of FIG. 5 illustrating the structure by which the target is made to appear at the focal point of the microscope;

FIG. 7 is a cross-sectional view of the body and the mirror of the structure of FIG. 5;

FIG. 8 is an isometric view of a guide plate that forms a part of the unit of FIG. 5; and FIG. 9 is a cross-sectional view of the image projector portion of the unit of FIG. 5.

DETAILED DESCRIPTION

The apparatus shown in FIG. 1 is representative of a number of bonding machines. It is, in fact, a bonding system. This particular embodiment is intended for use in performing a number of tasks including the creation of wire bonds between an integrated circuit chip and a set of terminals. The work element is an integrated circuit which is bonded to a base along with a number of terminals by which the unit can be connected to other electronic circuitry and apparatus. The task is to complete wire connections from points on the integrated circuit chip to the several terminals. The work piece is so small that it is hidden from view in FIG. 1 by the work tool 20. Tool 20 is an ultrasonically activated element which bonds portions of the wire 22 to the integrated circuit chip and the terminals. The work piece is mounted atop a work holder 24. The latter is mounted upon a platform. 26. The platform is moveable relative to the main body 28 of the instrument by motion of a micro-positioner handle 30. In this embodiment of the invention, the work holder 24 is a truncated conical structure which can be rotated about its central axis to change the angular position of the work piece. That motion is accomplished through an internal vernier mechanism so that very fine adjustment is possible. Motion of the micro-positioner handle 30 toward and away from the instrument 28 has the effect of moving the platform 26 so that the holder and the work piece is moved toward and away from the main body 28. Motion of the handle 30 in the direction perpendicular to the page results in translation of the platform 26 in the direction perpendicular to the page. Thus it is that the operator of the system can move the work piece back and forth, from side to side, and through a rotational angle. In this particular embodiment, the work piece is not moveable in the Z direction.

The tool 20 can be, and is, moved in the X, Y, and Z directions. In this case, that motion is pre-programmed and is controlled by stepping motors and logic circuitry that is housed within the main body 28 of the unit, and is initiated or accomplished by the operator through a series of front panel switches. The operator rotates the work piece such that its initial rotational orientation is correct, and moves the work piece so that one portion of it is in alignment with the line of action of tool 20. That having been done, the operator actuates a switch whereupon the bonding machine undertakes to accomplish a sequence of bonding operations. In this particular machine, that is accomplished by motion of the tool in the X and Y directions, as well as in the Z direction. In other versions, to which the invention is equally applicable, that automatic sequence of operation includes movement of the plateform 26, and therefor the work piece, in the X and Y direction as the tool is moved in the Z direction.

The operation views the work through the eye pieces of the stereo microscope 30. The microscope is a standard one except for the addition at its objective end of a structure for developing, projecting and displaying a target image so that it will appear to lie on the work piece. That structure is generally designated by the reference numeral 34. It is shown separated from the microscope in FIG. 5, and elements of it are shown in FIGS. 6, 7, 8 and 9.

One example of a work piece is shown in FIG. 2. It includes a base 35 upon which an integrated circuit chip 36 has been mounted. A number of terminals are fixed to the periphery of the base 35. For identification, several of those terminals are identified by the reference numeral 37. The work to be accomplished by the system shown in FIG. 1 is to connect wires from points of the integrated circuit chip 36 to the several terminals 37. The wire must be bonded to the circuit chip at one end and must be paid out to its respectively associated terminal to which it is bonded. For identification, one of those wires has been given the reference numeral 38.

In this case only, part of the chip 36 is visible in the field of view of the microscope, but that presents no problem. The operator's task is simply to align one reference point on the integrated circuit chip in the line of action of the tool 20. That having been done, and action of the machine having been initiated, the entire bonding task will be completed automatically. In this example, the target image appears at the places indicated in FIGS. 3 and 4. The representation in those figures is schematic, while lines and bars are outlined in the figure by black lines marking their edges, in the preferred embodiment of the invention they appear as lines and bars that are illuminated more brightly than the remainder of the field. The long line 139 and the L-shaped line 140 are arranged to assist the operator in orienting the work piece rotationally. The four bars at the lower right of FIG. 3 are identified together by the reference numeral 141. Together, the light elements 139, 140 and 141 are called the target image, and the target image is visible through the microscope whether or not the work piece has been placed in the field of view. The shape and arrangement of the target is made different for different applications.

In FIG. 4, the work piece has been moved into the field of view and it has been rotationally oriented so that its circuit runs 142 and 144 are parallel with target image lines 139 and 140, respectively. The space between the target image lines 139 and 140 is matched so that it falls opposite a circuit pad 145. Further, the circuit chip 36 is arranged so that one of its pads 146 falls within the target image 141.

Alignment of the target image and work piece is all that is required after the target image has been aligned with the line of action of the tool and with the point at which that tool is to do its work. Understanding of the step of initial alignment will be facilitated by an understanding of the apparatus depicted in FIG. 5. That apparatus comprises a body 40 which is generally cubical except that a widge shaped section is cut away from the lower rear portion to form a surface which lies in a plane at 45° to the plane of the upper surface of the body. The body is formed with a through bore 41 which extends perpendicular to the upper surface of the base and parallel to its side. The wall of the bore 41 is designated by the reference numeral 42 in FIGS. 5 and 7. It extends through a cylindrical upward projection 44, the exterior of which is threaded to mate with internal threads at the output end of the microscrope 32. The through bore marked by walls 42 is intersected by a bore 43 formed through the forward face 46 of the body so that its axis intersects the axis of the first described bore 41 at the surface of a partial mirror 48 which is mounted on the lower sloping surface 50 of the body, or, as in this case, in a recess formed in that face. The mirror is only partially reflecting. When the body is attached to the output end of the microscope as shown in FIG. 1, the work piece and work tool are visible through the mirror to an operator looking into the microscope at its eye pieces. A light image is projected through the lateral opening 43 onto the upper face of the mirror 48 so that the image is visible to the operator when looking into the microscope along with the work piece.

The light image is developed in the image developing structure shown in FIG. 9. That structure comprises a cylindrical member 54 formed with a circular flange 56 at its forward end. The central bore of the unit is identified by the reference numeral 58. That bore is enlarged at the forward end of the member to accommodate two circular elements. One is a frosted glass 60 which serves to diffuse light passing through it in small degree. The other is a transparency 62 which is opaque except at those areas that are to form a light image. In this embodiment, the transparency 62 is dark except along lines corresponding to lines 139 and 140 and the bar set 141 that is shown in FIG. 3. In this case, the diffuser 60 and the transparency 62 are not arranged perpendicular to the axis of the cylindrical member 54, but are mounted in a plane that makes an angle with that axis. The angle is equal to the angle between the line of action of the work tool 20 and the line of sight from the microscope to the work piece in FIG. 1. Mounting the diffuser and the transparency at that angle insures that the target image will appear to lie flat upon the work piece when the unit is completely assembled and in operation. The target image is formed by a light from lamp 64 which is mounted just ahead of the diffuser 60 in a T-slot formed in the front face of the member 54 on a circuit board 66 just behind the cover plate 68. In this embodiment, the lamp is a low wattage, grain-of-wheat style unit.

It is preferred that the image of the target appear to lie directly atop the work piece, and to that end, it is necessary that the actual or effective distance from mirror 48 to the transparency 62 be the same as the distance from the mirror to the work piece. To that end, means is provided for projecting the image developed by the transparency in the lamp 64 onto the mirror which is adjustable in the sense that it can change the distance from the mirror to the transparency. That means is provided by a sub-base 70 in the form of a generally rectangular block having a through bore on an axis perpendicular to its broad faces. A cylindrical tube 72 has its rearward end press fitted into that axial opening. It extends forwardly from the sub-base and it has an inside diameter only slightly larger than the outside diameter of the cylindrical member 54 so that the latter is free to telescope into the tubular sleeve 72. The sleeve is slotted from one end to receive the shank of a clamp nut 74. One wall of the slot is visible in FIG. 6 where it is identified by the reference numeral 76. The clamp screw has a knurled thumb wheel as a head. The screw extends through the slot in member 72 into threaded connection with an opening 78 in the side wall of the tubular member 54. That construction is best seen in FIGS. 6 and 9. Unlike prior art image projectors which require an optical focusing system, this unit requires no lenses. It is necessary only to loosen the thumb screw 74 and to move member 54 telescopically into tube 72 until the image of the target on transparency 62 appears to be at the same level as the work piece when viewed through the microscope 32. At that point, the thumb screw 74 is tightened and adjustment is complete. No lenses are required, and that is one of the objects of the invention.

There is a guide plate 80 between the body 40 and the sub-base 70. As best seen in FIG. 8, it is shown with a vertical way 82 formed on its forward surface and a horizontal way 84 formed on its rear surface. Both of those ways extend across the mid-region of the guide plate and are generally rectangular in cross-section. Both of them are interrupted by a central opening 86 which extends entirely through the plate to permit the passage of light from the bulb 64 and transparency 62 through the bore 68 of member 54 and through the center of the sleeve 72 and the opening in the sub-base 70, and then through opening 86 in the guide plate, and finally through the bore 52 in the body 40.

The rear face of the sub-base 70 is formed with a vertical slot 88 which is rectangular in cross-section and slidably receives the weight 82 of the guide plate, so that the sub-base 70 can be moved up and down relative to the guide plate as the way 82 slides through the guide slot 88. The forward face of the body 40 is also provided with a slot. Its slot 90 extends in the horizontal direction and has cross-sectional area so that it forms a sliding fit with the way 84 at the rear side of the guide plate. Accordingly, the combination of the sub-base 70 and guide plate 80 can be moved horizontally together relative to the body as the way 84 slides in the slot 90. The sub-base 70 is held against the forward face of guide plate 80 and the latter is held firmly against the forward face of the body 40 by a pair of tension springs. There are two tension springs, one on each side of the unit. Only one of them is visible in the drawing. Except for being on opposite sides of the unit, the springs and the spring mounts are alike. One end of spring 92 is looped around a pin 94 which is fixed to the body 40. The other end of spring 92 is looped around a pin 96 which is fixed to the sub-base 70. The springs and the guide plates, and the ways and the correponding grooves, provide a means for which the position of the target image can be moved from side to side and up and down the mirror 48. Actual adjustment is accomplished with a pair of knobs 100 and 102 which operate eccentric mechanisms the constructional details of which are not shown. Knob 102 is connected to a shaft which extends through a hole in the sub-base 70 and the slot 106 in guide plate 80 to an eccentric wheel in an opening in the forward face of the body 40. The knob 100 is connected to an eccentric wheel in the opening in the rear face of the sub-base 70 and thence through the opening 108 in member 80 into a corresponding hole in the forward face of the body 40.

INITIAL ALIGNMENT

Initial alignment of the apparatus is accomplished by placing a reference work piece on work holder 24 to establish a reference elevation. Thereupon, the tool is applied to the reference work piece so that its point of engagement and action is marked on the reference work piece. Without moving the reference work piece, the tool is withdrawn. The stereo microscope is adjusted so that the mark on the reference work piece that represents the point of action of the tool is clearly in focus. Thumb screw 74 is loosened and the position of the telescoping member 54 in tube 72 is adjusted. It is adjusted until the target image that is projected onto the mirror 48 appears to be coincident with the top of the reference work piece, or otherwise lie at the same level at which the work position appears to lie. That having been done, the thumb screw 74 is tightened.

Using the thumb screws 100 and 102, the operator moves the target image on the mirror until the image coincides with the point of action, or work position, at which the tool interacts with the reference work piece. That having been done, X and Y alignment has been completed.

In those cases in which the system automatically completes a number of bonding tasks, following initial alignment at one point, it may also be necessary to insure that rotational alignment is proper. In some cases, that is done by orientation of the transparency 62, and in other cases it is accomplished by rotation of the work holder 24. Just what is required depends upon whether or not the system moves the work or the tool, or both, to complete its bonding cycle. This unit assumes that orientation can be accomplished by rotation of the work holder 24 so that elements of the work piece line up parallel with the target lines 139 and 140 and so that other elements of the target image align with pads 145 and 146. If original alignment requires rotation of the transparency 52, that can be accomplished easily because the transparency is accessible from the forward end of the unit as best shown in FIGS. 5 and 9.

In many instances, it is possible to align the target with the point of action of the tool without any need to use the tool to mark a reference work piece or even to remove the tool. In the preferred form of the invention, the work piece is viewed on a line of sight that forms an angle with the line of action of the tool 20. An angular difference of about 15° is preferred. In this embodiment, the tool operates in a vertical line of action and the line of sight is canted from the vertical through an angle of 15°. To compensate for that, the transparency 62 is arranged at an angle of 15° to the axis of bore 58 in FIG. 9. It is necessary that the work piece be positioned such that the work point falls at the point of intersection of the line of sight through the microscope and the line of action at the tool. The tool is lowered to the reference work piece and the target is moved on the mirror so that it is in apparent coincidence with the point of action of the tool. Thereafter, it is necessary only for the operator to move each work piece until its reference position coincides with the appropriate point in the target image. That having been done, the tool will move to, and do its work at, the appropriate place when the work cycle is initiated.

The level of target image illumination can be very much lower than the level of illumination at the work place. Unlike the situation that obtains when the target image is projected directly onto the work piece and in which the ambient illumination tends to mask the target image, in the invention the target image light is simply added to or superimposed on the light from the target. The level of the target illumination competes with the level of light that is reflected from the work place rather than the level of light that is directed toward the work place. The result is that the target image can be generated with a lamp so small that its heat output is negligible. Its mounting structure can be made very lightweight, and as best shown in FIG. 1, there is no need to provide a clear light path from the point at which the target image is generated to the work place. No limitation is imposed on placement of tools or work piece, or handling equipment by any need to project a target image directly onto the work piece.

Although I have shown and described certain specific embodiments of my imvention, I am fully aware that many modifications thereof are possible. My invention, therefore, is not to be restricted except insofar as is necessitated by the prior art.

I claim:

1. In a conductor bonder of the kind in which a work piece, viewed through a microscope, is moved relative to the working position of a tool, the improvement which comprises:
    a partially reflecting mirror;
    means for holding said mirror externally of the microscope optics in the field of objective view of the microscrope;
    a target;
    image developing means for developing an image of the target and for projecting that image on the mirror such that it is visible when viewing through the microscope; and
    distance altering means for altering the distance of the target from the mirror such that said image can be made to appear at a selected level relative to the level of field that is in focus when viewed through the microscope.

2. The invention defined in claim 1 which further comprises image tilting means for causing the image of the target to appear to lie in a plane that is tilted out of perpendicularity with the objective light path.

3. The invention defined in claim 1 in which said means for holding said mirror comprises a first housing formed with openings defining an objective light path, the mirror being disposed in the housing in a plane lying at an angle to said objective light path;
    said means for projecting said image of the target on the mirror being effective to project the image to the mirror on a projection line that forms a given angle with the plane of said mirror;
    said invention further comprising translating means for translating the point of impingement of said image on said mirror without altering the magnitude of the angle that said projection line forms with said mirror.

4. The invention defined in claim 3 in which said means for projecting said image comprises a second housing and a light source carried by said second housing, said second housing being carried by said first housing and defining a pathway for light from said light source to said first housing there to impinge on said mirror;
    said translating means comprising means for interconnecting said first and second housings and for altering their point of interconnection.

5. The invention defined in claim 4 in which said second housing includes means for holding said target in the path of light from said light source to said mirror;
    said image tilting means comprising means for holding said target such that one point of the target is more distance from the light source than is another part of the target.

6. The invention defined in claim 4 in which said distance altering means comprises means for altering the distance from said point of interconnection of said first and second housing to said target and to said light source.

7. The method of aligning a work piece, viewed through a microscope and through a partially reflecting mirror, with a work point in the line of action of a bonding tool, which method comprises the steps of:
    placing said mirror in the objective field of the microscope;
    projecting an image of a target onto said mirror;
    viewing said image and said work position of the tool together through said microscope;
    adjusting the position of said image into coincidence with a line of sight to said work position;

adjusting the microscope such that the work position of the tool is at the distance in the field that is in focus when viewed through the microscope;

adjusting the projected image of the target such that it appear at a selected position along the objective path relative to said focal point and work position; and moving a work piece into the objective field of the microscope such that its work point is aligned with said target image.

8. The invention defined in claim 7 which comprises the further step of adjusting the projected image of the target such that the image appears in a selected plane which contains said selected position and extends in a direction other than perpendicular to the objective light path.

* * * * *